United States Patent [19]

Farraye-Callahan et al.

[11] Patent Number: 5,032,339
[45] Date of Patent: Jul. 16, 1991

[54] PROCESS FOR SHAPING FIBER REINFORCED THERMOPLASTIC ARTICLES

[75] Inventors: Elizabeth A. Farraye-Callahan, New Castle; Frank P. Gay, Hockessin, both of Del.

[73] Assignee: E. I. Du Pont de Nemours and Company, Wilmington, Del.

[21] Appl. No.: 554,476

[22] Filed: Jul. 19, 1990

[51] Int. Cl.$^5$ .................. B29C 43/02; B29C 43/18; B29C 51/42

[52] U.S. Cl. .................. 264/235; 264/257; 264/322; 264/346

[58] Field of Search .......... 264/134, 135, 136, 230, 264/235, 234, 237, 319, 320, 322, 324, 325, 345, 346, 348, 257

[56] References Cited

U.S. PATENT DOCUMENTS

| | | | |
|---|---|---|---|
| 4,304,751 | 12/1981 | Li et al. | 264/322 |
| 4,390,489 | 6/1983 | Segal | 264/126 |
| 4,469,270 | 9/1984 | Gartland | 264/522 |
| 4,970,044 | 11/1990 | Kim | 264/320 |

Primary Examiner—Jay H. Woo
Assistant Examiner—Jeremiah F. Durkin, II

[57] ABSTRACT

A process for making a preform of fiber reinforced thermoplastic material, debulking the preform, subjecting the preform to heat and pressure to form a molded article, then subjecting the article to a predetermined quenching cycle that centralizes void location in the molded article.

2 Claims, 2 Drawing Sheets

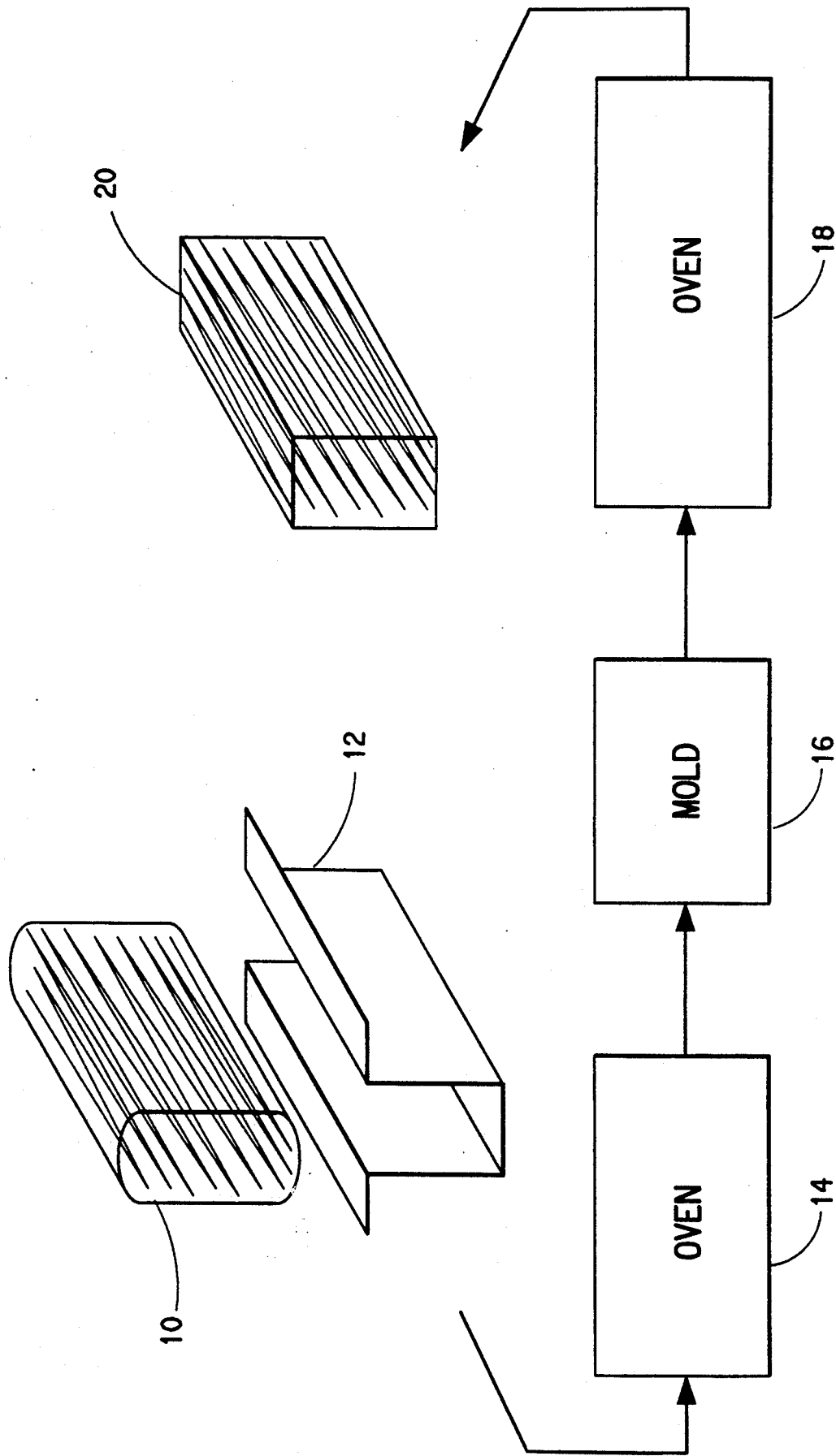

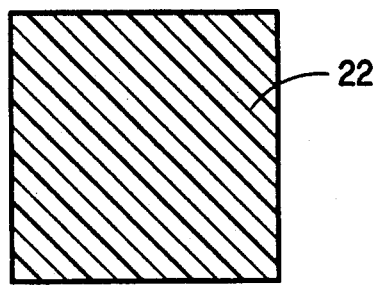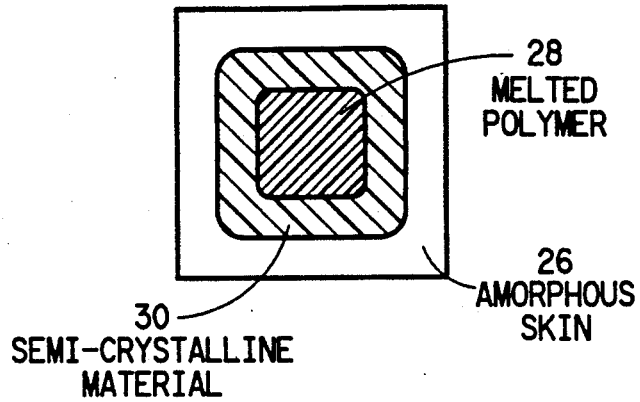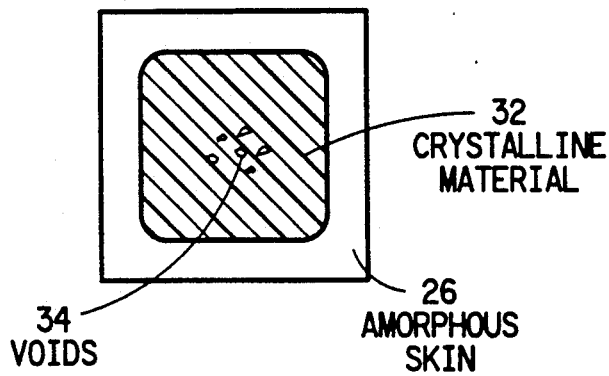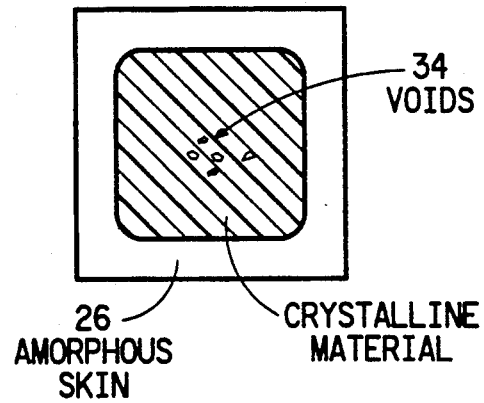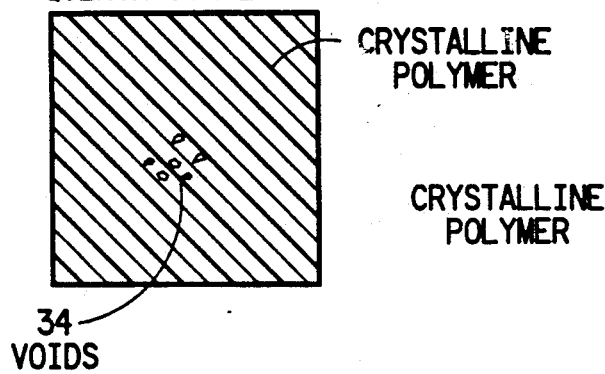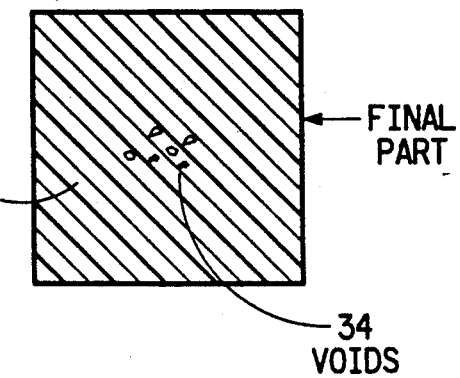

PROCESS FOR SHAPING FIBER REINFORCED THERMOPLASTIC ARTICLES

BACKGROUND OF THE INVENTION

This invention relates to a process for shaping fiber reinforced thermoplastic articles in a molding or stamping operation. More particularly, it relates to shaping such an article wherein a preshaped preform of the final article is preheated in an oven, then transferred to a substantially unheated mold where the preform is compression-consolidated followed by tempering the molded article in an oven to provide predetermined structural integrity.

The rapid molding of thermoplastic resins with or without reinforcement into shaped articles is known in the art.

Nairn and Zoller discussed the effects of matrix crystallization in composites (JJA Nairn and P. Zoller, V International Conference on Composite Materials ICCMV and J Matl. Science, 1985 (20)). The analysis centered on the large dimensional changes involved in cooling semi-crystalline matrices from high temperature melts to room temperature and the associated strains imposed by shrinkage and constraint of reinforcing fibers. FIG. 1 is a plot of the magnitude of the shrinkage for several polymers derived from PVT (pressure-volume-temperature) measurement. Nairn measured the strain optically on an amorphous matrix resin where the retardation at the fiber matrix interface could be followed, and the results showed substantial stress build-up at the interfaces.

The conclusion was that thermoplastic materials, with a large temperature difference between forming temperature and room temperature, will show substantial internal strain. When crystallization of the matrix is superimposed in a heat-crystallize-cool cycle, resulting strain levels may be above those the matrix can tolerate and result in actual fraction of the sample. It is clearly important to minimize the strain effects on temperature cycling discussed by Zoller and Nairn.

The levels of strain which may be encountered in a semi-crystalline polymer on cooling from the melt to room temperature can be seen directly on a PVT curve where specific volume is plotted against temperature. The increase in specific volume ($=1$/density) measures the thermal expansion on heating a sample from room temperature into the melt. A cooling curve will normally follow a different path, but the melt and room temperature specific volumes will be similar to the heating values.

P. Aoller and P. Bolli, J. Macromol. Sci. Phys., B18, 555 (1980) disclose heating and cooling curves for polyethylene terephthalate (PET). Nylon 6,6, polypropylene (PP), polyether ketone ketone (PEKK), polyarylate (PAR), amorphous copolyamide (J-2) and an amorphous polyester (PETG). These data can be helpful in the task of minimizing strain related flaws in composites.

If crystallizable polymers are cooled slowly from the melt, they will in general crystallize. PE and PP will crystallize rapidly at only moderate supercooling below the normal melting points. PET will crystallize slowly at a higher (30°-40° C.) supercooling while a PAR such as DPPG-I may not crystallize in a reasonable time. If the polymers are cooled rapidly from the melt, the differences are more striking. PE and PP will crystallize. Polymers such as PET, PAR or PEKK can be obtained as an amorphous glass below their glass transition temperatures. These amorphous polymers are less dense than their crystalline counterparts and tend to have much higher elongations than the crystalline counterparts. On reheating above Tg, these amorphous materials can relax (and relieve stress) and crystallize.

In general, there is a second temperature at which strain relaxation can occur in crystalline polymers. This is the zone where the specific volume curve begins to increase before melting. Heating into this zone can relieve strain but in some polymers can lead to formation of large spherelites.

In usual forming operations of composites, a relatively standard cycle occurs. The system is heated to the melt, compressed to shape and then cooled, frequently at a leisurely pace. Since cooling is at the face, freezing/crystallization occurs there first, while the bulk of the matrix resin is still liquid. As cooling continues, the crystallization front moves inward with concomittant shrinkage. This, in combination with the interfacial strain, imposes large stresses on the already crystallized material. For crystalline polymers with high elongation, such as PE and PP, the stress can be accommodated. For crystalline polymers which have low elongations to break, this can impose stresses leading to failure (flaw formation) or a state where relatively small additional strains can lead to failure. The effects can be quite significant in thick cross sections and show up as lowered strength and toughness.

The effects of a crystallization wave can be illustrated by following events in a thick rod of PET. When the molten polymer is formed, the rod diameter conforming to the mold will be made up of liquid with a specific volume $\geq 0.83$ cc/g. As the surface layer crystallizes, its specific volume will decrease while that of the liquid core remains essentially unchanged. As the crystallization wave moves inward (heat flows out to the mold) the surface, already under compression from the mold and its own shrinkage, experiences further stress from shrinkage of the inner crystallizing layers. Some compressive failure occurs until the crystallizing cylinder becomes thick enough to support the compressive load. At this point, further crystallization occurs and is associated with a large negative pressure of the order of 200 MPa is we assume symmetry of the shrinkage and compressive forces.

Experimentally, these effects can be seen in two ways. Polishing a cut cross section shows cracks throughout the cross section. The largest occur off center in the high negative pressure zone and proceed to the surface at an angle to the glass fiber direction. If the polishing is done by hand, it will be observed that the outer layer—the surface layer—of the cylinder is soft and easily abraded. Proceeding inward, a harder section is seen followed by another soft section and another hard section at the core. However, the problems involved in the rapid molding of thick sectioned fiber reinforced resin parts, especially those with high loading of reinforcement (>40% volume), for use in applications requiring high rigidity, structural integrity and geometric accuracy has not been addressed in the art.

SUMMARY OF THE INVENTION

The process of this invention involves making an engineered, near net shape preform starting with reinforced thermoplastic tow, debulking with heat and pressure and subjecting it to a controlled heating/compression molding/quenching cycle to obtain the desired final part properties.

For the preferred high melting, semi-crystalline polymers and parts having areas of large thickness, internal strain is induced due to large dimensional change (shrinking) involved in cooling from high temperature melts to room temperature semi-crystalline matrices and the constraint of the reinforcing fibers. For some systems, this strain can exceed the polymer's break elongation. For massive parts (approximately 1"×1"), a low flaw surface can often yield satisfactory mechanical properties. Methods of localizing voids or cracks away from the surface are necessary.

Known art for semi-crystalline, high reinforcement thermoplastic parts use "warm" molds (approximately 300° F.) that will result in the above surface flaws and corresponding decrease in structural properties. The present invention addresses this problem.

In the present invention, an amorphous skin approach is utilized to produce a controlled-flaw part. The approach involves quenching the external surface to a depth of 4-5 mm while allowing the center to crystallize. Subsequent reheating of the surface to around 150° C. allows the amorphous polymer to relax residual shrinkage strain and then crystallize to give an external surface stable in use at temperatures up to the crystallization temperatures. Subsequent cooling to room temperature introduces a strain level which is tolerable to matrix resins such as polyethylene terephthalate.

The amorphous skin is built by using a "cold" mold with sufficiently high heat transfer coefficient to remove heat from the polymer surface quickly so that crystals do not form. The crystallization front forms behind this skin of amorphous resin and proceeds to the center. The amorphous skin can be deformed extensively below the Tg of the polymer and, therefore, has the ability to contract and accommodate the continued internal thermal contraction of the core as it subsequently crystallizes due to its slower cooling rate. Once the center is crystallized, the skin is crystallized to provide long term integrity for the part. If instead the skin is allowed to crystallize fully before the center, the thermal contractions can generate stresses exceeding the polymer strain limit in thick sections and result in formation of large, distributed voids and cracks. This result would occur with the "warm" molds of the prior art previously discussed.

More specifically, the process involves preparing a fiber reinforced resin preform, heating the preform in an oven to a temperature sufficient to melt the resin but insufficient to degrade it. An inert atmosphere may also be provided to prevent resin degradation and to assist/retard heating in local areas of the preform via altered radiation, convection or conduction pathways. The heated preform is then placed in the female cavity of a substantially unheated but controlled temperature mold and consolidated by applying a predetermined force for a fixed period of time.

The molded part is removed from the mold and tempered in an oven according to a predetermined time temperature relationship. After tempering, the part is removed from the oven.

The process is also useful for products with amorphous and fast crystallizing matrices, such as amorphous polyamides and PE or PP. For amorphous resins, reheating the system to above the polymer Tg can substantially reduce the level of strain in the surface layer so that a tougher surface layer with low defect level is obtained. For polymers such as PE or PP, reheating to near the melting point (Tm minus 10° to 20° C.) will allow strains to relax and yield a tougher surface which retains the low defect level.

Suitable thermoplastic resinous materials which may be used include, but are not limited to, amorphous polyamides, polyether ketone ketones, polyether ether ketones and amorphous or crystalline polyesters.

The resin of choice is reinforced with fibers as, for example, carbon, glass, thermoplastic and aramid.

BRIEF DESCRIPTION OF THE DRAWINGS

FIG. 1 is a schematic flow diagram illustrating the major process steps of the invention.

FIGS. 2-7 are representations of a cross section of a thick portion of the article after each of the steps in the process.

DETAILED DESCRIPTION OF THE ILLUSTRATED EMBODIMENT

Referring now to FIG. 1, the process of the invention is shown to include a fiber reinforced resin preform 10 within a female mold cavity 12, which in this embodiment is illustrated as a bar, a preheating oven 14, a hydraulic press 16 and a quench oven 18. The molded article 20 is the result.

Several steps are involved in the creation of one thick cross section, flaw controlled, fiber reinforced thermoplastic part. First, the preform materials must be assembled in their required form, arranged precisely and usually debulked. Generally, the preform 10 is constructed from a prescribed arrangement of one or more forms of thermoplastic material, either reinforced or unreinforced. Thermoplastic coated glass tow is preferred and can either be continuous or chopped tow, or even a combination of both, suitable for the final part. The thermoplastic polymer coating softens when subjected to appropriate heat and will debulk and form a near net shape structure when subjected to pressure. The glass provides structural integrity. The debulked structure is suitable for rapid molding while maintaining pre-engineered glass geometry. The preform then goes through a very precise heating/molding/tempering cycle designed to obtain the best combination of final part properties in a minimum amount of time.

In the case of polyesters and polyamides, to prevent hydrolysis of the polymer the preform should be dried to less than 0.02% water by weight before proceeding to the final shaping steps. Hydrolysis is undesirable because the molecular weight level is lowered which can affect toughness properties adversely. In addition, steam bubbles can form and create defects. If preform drying is carried out in air, the drying temperature and time must be carefully selected (standard polymer drying procedures apply). Prolonged exposure to air at elevated temperatures not only has the positive effect of removing moisture, but also can have the negative effect of degrading the polymer.

The preform 10 is heated in oven 14 until the entire part is up to the thermoplastic melt temperature. Obviously, the preform surface will heat much more rapidly than the center, and in varied cross section parts the thick sections will lag substantially. In all cases, the preform is the limiting heat transfer medium and the center of the thickest section will heat last. FIG. 2 represents a cross section of the part at the end of the heating cycle; the polymer 22 is molten throughout. The fibers (not shown) retain their form.

At this point the heated preform 10 is moved to the mold 16 and is compression molded into the final shape under high pressure with a matched die set operating at substantially room temperature but in all cases lower than the temperature of the preform. The surface layer cools rapidly to give a surface skin of amorphous resin.

The low temperature of the mold rapidly removes heat from the preform 10. During a relatively short mold-closed period (30–60 seconds) a stable part is created having an amorphous layer 26 and a molten core 28 with an interface 30 between them of varying degrees of crystallinity (FIG. 3). Areas of the preform where the cross section is less than ¼ inch thick will be amorphous throughout. Note that fiber ends are not depicted in FIGS. 2–7 for clarity. Formation of the amorphous surface layer 26 is important since amorphous material does not go through a phase change during its cooldown and hence, when it is solidified, behaves as a tough glass. This skin can then conform to accommodate the strains imposed by thermal shrinkage and phase changes that occur during further cooldown.

Once molding is complete, the molded part is removed from the female cavity of the mold 16. The next step is tempering in oven 18. For thick section parts (>10 mm), tempering is divided into stages: cooling the part, a two-part reheating of the surface and a final rapid cooldown. For thin part cross sections, the temper has only two stages: a heating step where the right time at temperature will give optimum properties for a particular service followed by a rapid cooldown.

The purpose of the first temper stage is to maintain the amorphous surface layer by keeping the surface cool while crystallization is occurring in the core 32. Cooling is achieved by bathing the assembly at a low enough temperature and at sufficient flow to remove heat traveling to the surface from the molten core without excessive increase in surface temperature. At the end of this cooldown cycle, a part cross section (FIG. 4) would show that the amorphous skin 26 is maintained, that the polymer crystallized 32 and that some slight flaws 34 formed due to the thermal and phase change strains. Of particular importance is the fact that a substantially flaw-free zone is achieved. Development of this flaw-free zone is the result of using the cold mold process and contributes significantly to the final part properties.

The next stage is a two-step reheating (FIGS. 5–6). First, the part surface is heated very rapidly to the highest expected future service temperature and then it is held there for the time required to insure crystallization at that temperature. The initial rapid heat-up is necessary to insure that the entire part reaches the desired crystallization temperature and thereby avoid crystallization of the amorphous layer 26 at a temperature lower than the expected future service temperature. Alternatively, if crystallizing agents are added to the polymer, the reheating step may be eliminated.

The third stage of the temper cycle is a rapid cooldown of the part. At this point the part is completely crystallized and the flaws 34 are excluded from the surface so that they do not affect the integrity of the part (FIG. 7). Clamping may also be used to achieve fast cooldown with minimum warpage.

A preform consisting of PET coated glass tow with 60% resin content and 40% glass content was heated to 300° C. in a mold, compressed to form a 2.5 cm × 2.5 cm cross section and slowly cooled by convection and conduction. The effect of this processing is to create an outside-in crystallization front. A polished cross cut of the specimen showed extensive cracks covering most of the specimen. Surface areas of such samples, measured by BET-helium absorption, are substantial, of the order of 0.15 m$^2$/g. Displacement densities are lower than theoretical, usually in the range of 5–10% low.

A change in the molding cycle of the above-identified preform moderated the surface flaws significantly. After the melting-molding steps, the preform is transferred to a room temperature mold. The surface layer is rapidly cooled to give a surface skin of amorphous resin and the crystallization front forms behind this and proceeds to the center. Samples showed a quenched layer of 2–3 mm thick with a similar layer of low crystallinity behind it graduating to a normally crystalline core. The skin tolerated the shrinkage forces well and no signs of cracks were observed in polished sections in the outer 4–5 mm. Reheating to crystallizing temperatures (chosen to be used at temperatures of approximately 150° C. +15/−20° C.) allowed strains in the amorphous layer to relax as temperatures rose above the glass transition temperature and before crystallization began. Shrinkage of the resin because of crystallization was estimated at approximately 3% in the resin layer.

Polished cross sections again showed essentially no cracks penetrating the surface layers from the core. Displacement densities were in the range of 0–3% below theoretical. Surface area measurements on specimens cut from the skin (up to 5 mm deep) showed surface areas less than the detection limits by both krypton and helium adsorption.

What is claimed is:

1. A compression molding process for a molded article of fiber reinforced thermoplastic resin material that is in a near net-shape preform, said molded article to be formed in the substantially unheated female cavity of a mold shaped to conform to said article, said fiber having a higher melting point than said thermoplastic resin, heating said preform to a first temperature sufficient to melt said thermoplastic resin but insufficient to degrade said resin;

placing said heated preform into the substantially unheated female cavity of said mold;

consolidating said material in said mold to form said molded article by applying a predetermined force at an elevated temperature in said mold;

removing said consolidated preform from said mold; and tempering said molded article in an oven according to the following steps of cooling the molded article at a temperature and a heat flow to remove heat from the article without an excessive increase in surface temperature; reheating the article rapidly to the highest expected service temperature; maintaining said highest expected service temperature for a period of time needed to crystallize the entire molded article; and then rapidly cooling the molded article.

2. The process as defined in claim 1 wherein said fiber is glass and said resin is polyethylene terephthalate, said first temperature being about 300° C. and said highest expected service temperature being in the range of from about 130° C. to about 165° C.

* * * * *